Dec. 20, 1966 SANAE AMADA 3,293,653

TAPE RECORDING DEVICE

Filed Dec. 21, 1964

3,293,653
TAPE RECORDING DEVICE
Sanae Amada, Tokyo, Japan, assignor to Fujitsu Limited, Kawasaki, Japan, a corporation of Japan
Filed Dec. 21, 1964, Ser. No. 420,213
Claims priority, application Japan, Dec. 21, 1963, 38/68,889
5 Claims. (Cl. 346—101)

The present invention relates to a tape recording or teleprinter device. More particularly, the invention relates to a device for recording code marks, facsimile transmissions, alphabet letters, numbers or the like on a tape.

The tape recording or teleprinter device of the present invention is extremely versatile since it receives and reproduces and records code signals, facsimile signals, telemeter signals, alphabet letters, numbers or the like.

The tape recording device of the present invention includes start and stop control apparatus for controlling the operation of the device and positioning apparatus for properly positioning recorded intelligence on the tape.

Figure 1:
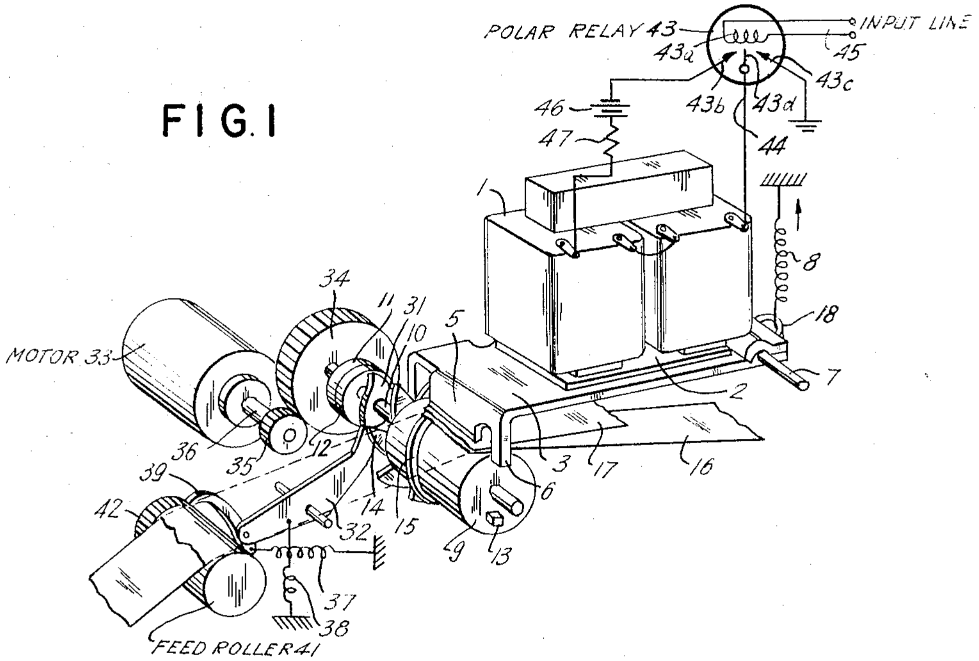
Figure 2A:
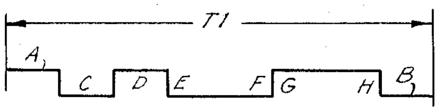
Figure 3:
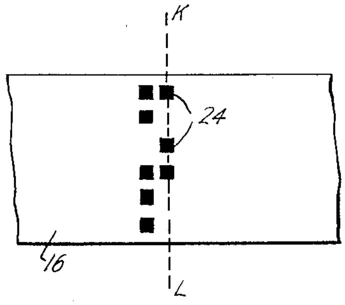
Figure 2B:
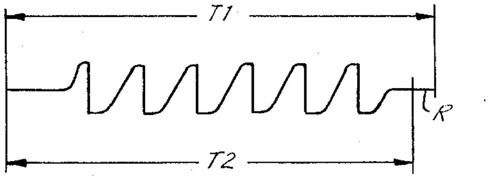
Figure 4:
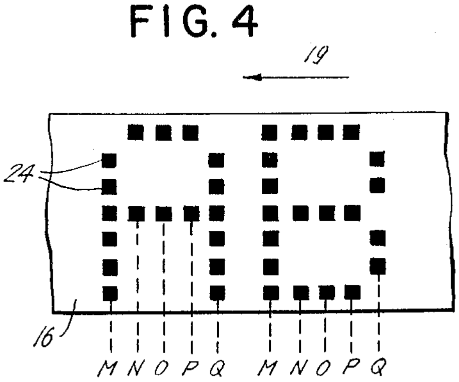
Figure 2C:
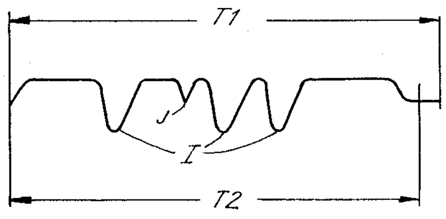

In order that the present invention may be readily carried into effect, it will now be described with reference to the accompanying drawings, wherein:

FIG. 1 is a perspective view of an embodiment of the tape recording device of the present invention;

FIGS. 2*a*, 2*b* and 2*c*, are a graphical presentation explaining the operation of the tape recording device of FIG. 1;

FIG. 3 is a view of a code recording of the tape recording device of FIG. 1; and FIG. 4 is a view of an alphabet letter recording of the tape recording device of FIG. 1.

In FIG. 1, a selector magnet 1 is energized by received electrical signals by any suitable means (not shown) for supplying said received electrical signals to said selector magnet. In the tape recording or teleprinter device of FIG. 1, it is preferred that the mutual relation of mark-space and ON-OFF signals supplied to the selector magnet 1 be opposite those of the usual type of teleprinter. That is, it is preferable to supply energizing current to the selector magnet 1 when a "space" signal is received and to cease energization of said selector magnet when a "mark" signal is received. This may be accomplished at the transmitter, but it may be readily accomplished at the receiver by any suitable means such as, for example, by changing the connections to the local relay of the receiver.

An armature 2 is positioned in operative proximity with the selector magnet 1. The armature 2 includes an extending member 3 affixed to said armature and having a projecting portion 4 which functions as a cam follower, a projecting portion 5 which functions as a printing or recording hammer, and a projecting arm 6 which functions as a stop arm.

The extending member 3 is pivotally mounted on a shaft 7 for rotary movement about said shaft. A tension spring 8 is affixed at one end to a loop 18 at the end of the extending member 3 and urges said extending member to rotate in a counterclockwise direction about the shaft 7.

A drum 9 is coaxially mounted adjacent the axial end of a shaft 10 which is suitably mounted for rotation by any suitable bearing means (not shown). The drum 9 is suitably mounted for rotation by any suitable bearing means (not shown). The drum 9 is adapted to be driven by the shaft 10 by any suitable engaging or driving means such as, for example, a first friction disc 11 coaxially affixed to said shaft and a second friction disc 12 coaxially affixed to the shaft of said drum. One or both friction discs 11 and 12 may comprise a felt material, for example. Rotation of the shaft 10 about its axis drives the drum 9 about its axis.

As in a usual teleprinter, the direction of rotation of the shaft 10 about its axis is counterclockwise. The speed of rotation of the shaft 10 is selected so that the time for one revolution of said shaft is a little less than the transmission time of the code indication for a single alphabet letter or the longitudinal extent of a picture or facsimile element. When alphabet letters or facsimile signals or the like are transmitted, a start-stop code signal is transmitted with each longitudinally extending portion of the picture or the like.

A small projection or dog 13 extends from one of the flat surfaces of the drum 9 and is positioned to abut the stop arm 6 of the extending member 3 near the end of one revolution of said drum. When the dog 13 abuts the stop arm 6, the rotation of the drum 9 is stopped. When the extending member 3 is pivoted in a clockwise direction about its shaft 7, by energization of the selector magnet 1, the dog 13 is released from abutment with the stop arm 6 and the drum 9 rotates at the same speed of rotation or angular velocity as the driving shaft 10.

A cam or detent type wheel 14 is coaxially affixed to the flat surface of the drum 9 opposite that from which the dog 13 extends. The cam 14 functions to abut the projecting portion 4 of the extending member 3 to urge said extending member in a clockwise rotation about the shaft 7. The operation of the cam 14 is illustrated by the graphical presentations of FIG. 2.

A spiral projection or protrusion 15 extends from the cylindrical surface of the drum 9. A paper tape 16 is positioned for longitudinal movement between the projecting portion 5 of the extending member 3 and the cylindrical surface of the drum 9. An ink, carbon or other suitable marking strip 17 is positioned for longitudinal movement between the tape 16 and the projecting portion 5 of the extending member 3. Although the tape 16 and the marking strip 17 are shown in FIG. 1 in short lengths, each of the tape and the strip extends longitudinally and is moved in a longitudinal direction by any suitable tape moving device (not shown).

FIG. 2 serves to aid in explaining the operation of the tape recording system of the present invention. FIG. 2*a* illustrates the waveform of a current signal received for energizing the selector magnet 1. The waveform of FIG. 2*a* includes a start signal A and a stop signal B. The intelligence signal portions of FIG. 2*a*, C, D, E, F, G and H, represent one longitudinal element of a facsimile transmission, picture or the like, or the code for one alphabet letter. As previously mentioned, the received mark signal is preferably utilized to deenergize the selector magnet 1 and the received space signal is preferably utilized to energize said selector magnet.

FIG. 2*b* illustrates the operation of the cam 14. The cam 14 abuts the projecting portion 4 of the extending member 3 when the leading edge of the received code signal is received and moves said extending member clockwise about the shaft 7 thereby moving the armature 2 into contact with the selector magnet 1. The cam 14 releases the extending member 3 during the time that the code signal is being received, so that said extending member then moves counterclockwise about its shaft 7 due to the force of the spring 8.

If the code signal received is a "space" signal, the selector magnet 1 is energized and attracts the armature 2 and the extending member 3 thereby preventing said extending member from rotating counterclockwise when the cam 14 releases the projecting portion 4. If the code signal received is a "mark" signal, the selector magnet 1 is unenergized and the extending member 3 rotates abruptly counterclockwise when the cam 14 releases the projecting portion 4. This causes the projecting hammer portion 5 of the extending member 3 to strike the spiral projection 15 of the drum 9 through the marking strip 17 and the paper tape 16 to record a mark on said paper tape.

FIG. 2c illustrates the operation of the projecting hammer portion 5 of the extending member 3. The negative peaks I of the curve of FIG. 2c represent the recording of marks on the paper tape 16. The negative peak J of the curve of FIG. 2c represents the situation wherein the extending member 3 begins to rotate in a counterclockwise direction but is prevented from striking the spiral projection 15 of the drum 9 with its projecting hammer portion 5 by the cam 14 so that there is no recording of a mark.

As illustrated in FIG. 3, marks, spots or dots 24 are printed or recorded on the paper tape 16 in a transverse line KL. FIG. 3 illustrates the usual manner of recording code signals on tape. The tape recording device of the present invention, however, permits the recording of pictures, facsimile signals, telemeter signals, alphabet letters, numbers or the like. FIG. 4 illustrates a record of alphabet letters made by the tape recording device of present invention.

In FIG. 4, as recorded on the paper tape 16, each alphabet letter comprises five transverse lines M, N, O, P and Q of seven marks, spots or dots 24. The alphabet letter "A" is recorded by first printing six marks 24 in the first transverse line or row M successively during one rotation of the drum 9. The tape 16 is then stepped a determined distance in the direction of an arrow 19 by any suitable tape stepping device (not shown) and when it is stopped, two marks 24 are printed in the second transverse row N during the next rotation of the drum 9. The process is repeated, with two marks 24 being recorded in the third transverse line O during the third rotation of the drum, two marks 24 being recorded in the fourth transverse line P during the fourth rotation of the drum, and six marks 24 being recorded in the fifth transverse line Q during the fifth rotation of the drum.

In the tape recording device of the present invention, selective operation of the selector magnet 1 occurs when the armature 2 is moved toward said selector magnet mechanically, so that it operates as a holding type magnet and requires very little electrical energy and causes very little relay contact wear. The necessary electric current of the selector magnet 1 may be decreased at the start of operation by utilizing a cam 14 which urges the armature 2 toward said selector magnet most of the time. This is illustrated at R of the curve of FIG. 2b.

In FIGS. 2a, 2b and 2c, T1 is the time of one cycle of received signals and T2 is the time of one revolution of the drum 9. One cycle of the received signals is determined by the start and stop signals of a longitudinal line of signals, or by the time for receiving a whole alphabet letter, or by the time for receiving the code signals representing an alphabet letter.

The tape recording device of the present invention thus records fasimile signals, telemetering signals, pictures, alphabet letters, numbers and the like as well as code signals, and accomplishes such recording with simple structure and very little consumption of electrical energy. Since the device of the invention utilizes start-stop synchronism, disorders of the recorded waveforms caused by synchronism defects and in the course of transmission are readily prevented.

While the invention has been described by means of specific examples and in a specific embodiment, I do not wish to be limited thereto, for obvious modifications will occur to those skilled in the art without departing from the spirit and scope of the invention.

I claim:

1. A tape recording device, comprising a selector magnet adapted to be energized and deenergized by received electrical signals;

an armature positioned in operative proximity with said selector magnet and adapted to be attracted by the said selector magnet when the said selector magnet is energized;

an extending member affixed to said armature and having a projecting portion and a projecting hammer portion;

mounting means movably mounting said extending member in relation to said selector magnet so that attraction of said armature by the said selector magnet causes attraction of the said extending member;

a rotatably mounted drum positioned in operative proximity with the projecting portion and projecting hammer portion of said extending member, said drum having a cylindrical outer surface having a substantially spiral projection extending therefrom and adapted to be struck by said projecting hammer portion of said extending member upon abrupt deenergization of said selector magnet following energization of the said selector magnet;

driving means for rotating said drum at a determined rate; and cam means affixed to said drum and rotatable with said drum and adapted to abut said projecting portion of said extending member at determined times to move the said extending member and said armature into contact with said selector magnet so that upon energization of the said selector magnet the said armature is already in contact with the said selector magnet and is not moved by the said selector magnet.

2. A tape recording device as claimed in claim 1, further comprising a paper tape positioned between the outer cylindrical surface of said drum and the projecting hammer portion of said extending member and a marking strip positioned between said projecting hammer portion and said paper tape, said paper tape and said marking strip being adapted to be stepped longitudinally in determined increments.

3. A tape recording device as claimed in claim 1, wherein said extending member has a stop arm extending therefrom and said drum has a substantially flat end surface having a projection extending therefrom in operative proximity with the stop arm of said extending member in a manner whereby when said selector magnet is deenergized said stop arm abuts said projection and stops rotation of said drum.

4. A tape recording device as claimed in claim 1, wherein said mounting means comprises means for pivotally mounting said extending member at one end thereof to enable pivotal movement thereof toward and away from said selector magnet.

5. A tape recording device as claimed in claim 4, further comprising spring biasing means connected to said one end of said extending member for urging the said extending member in a determined direction.

References Cited by the Examiner

UNITED STATES PATENTS

| | | | |
|---|---|---|---|
| 2,151,936 | 3/1939 | Pflugner et al. | 346—101 |
| 2,154,528 | 4/1939 | Rassow et al. | 178—5 |

RICHARD B. WILKINSON, *Primary Examiner*.

J. W. HARTARY, *Assistant Examiner*.